(12) United States Patent
Zagoroff

(10) Patent No.: US 6,209,366 B1
(45) Date of Patent: Apr. 3, 2001

(54) TRUCK TAILGATE LOCKING DEVICE

(75) Inventor: Dimiter S. Zagoroff, Lincoln, MA (US)

(73) Assignee: Steadfast Corporation, Chelsea, MA (US)

( * ) Notice: Subject to any disclaimer, the term of this patent is extended or adjusted under 35 U.S.C. 154(b) by 0 days.

(21) Appl. No.: 09/213,645

(22) Filed: Dec. 17, 1998

Related U.S. Application Data (60) Provisional application No. 60/069,930, filed on Dec. 17, 1997.

(51) Int. Cl.⁷ .................................................. B60R 25/02
(52) U.S. Cl. ............... 70/208; 292/DIG. 3; 292/DIG. 43
(58) Field of Search ............ 70/208, 209; 292/DIG. 31, 292/DIG. 29, DIG. 43, DIG. 42, 336.3; 296/50, 57.1; 411/910, 911

(56) References Cited

U.S. PATENT DOCUMENTS

| | | | |
|---|---|---|---|
| 1,842,741 | * | 1/1932 | Bengtsson ........................ 411/911 X |
| 3,126,219 | * | 3/1964 | Engesser et al. ................. 411/911 X |
| 4,850,209 | * | 7/1989 | Weinerman et al. ................... 70/208 |
| 4,911,487 | * | 3/1990 | Rachocki ........................... 70/208 X |
| 4,951,486 | * | 8/1990 | Braun et al. ........................... 70/208 |
| 5,004,287 | * | 4/1991 | Doyle ........................ 292/DIG. 43 X |
| 5,104,171 | * | 4/1992 | Johnsen et al. ........................ 296/50 |
| 5,172,946 | * | 12/1992 | Dowling ............................... 292/216 |
| 5,265,450 | * | 11/1993 | Doyle ........................ 292/DIG. 29 X |
| 5,297,405 | * | 3/1994 | Manning et al. ...................... 70/208 |
| 5,303,971 | * | 4/1994 | Johnsen et al. .................... 70/208 X |
| 5,340,174 | * | 8/1994 | Bender et al. .................... 292/336.3 |
| 5,439,260 | * | 8/1995 | Weinerman et al. .............. 70/208 X |
| 5,595,076 | * | 1/1997 | Weinerman et al. .................. 70/208 |
| 5,713,705 | * | 2/1998 | Grunbichler ..................... 411/910 X |
| 5,941,104 | * | 8/1999 | Sadler .................................. 70/208 |
| 5,987,943 | * | 11/1999 | Verga et al. ........................... 70/208 |

* cited by examiner

Primary Examiner—Suzanne Dino Barrett
(74) Attorney, Agent, or Firm—Hamilton, Brook, Smith & Reynolds, P.C.

(57) ABSTRACT

A tailgate locking device includes a bezel used in place of the conventional bezel to surround a tailgate handle aperture. When a key-operated lock is rotated to a locked position, it moves a locking arm into position in front of a handle arm thereby preventing an interloper from actuating the handle to open the tailgate. Preferably the key-lock rotation also moves one or more retention bolts into positions behind the exterior panel of the tailgate to prevent removal of the locking device. Rotation of the lock to its unlocked position frees the tailgate handle and retracts the retention bolts.

9 Claims, 8 Drawing Sheets

TRUCK TAILGATE LOCKING DEVICE

RELATED APPLICATION

This application claims priority from Provisional Application Ser. No. 60/069,930, filed Dec. 17, 1997 entitled TRUCK TAILGATE LOCKING DEVICE.

FIELD OF THE INVENTION

This invention relates generally to anti-theft tailgate devices and more specifically to an anti-theft tailgate locking assembly which effectively prevents actuation of the tailgate handle to open the tailgate.

BACKGROUND OF THE INVENTION

A pickup truck typically has a cargo space secured by a tailgate. Pulling up on the tailgate handle releases a latching mechanism so that the tailgate may be swung down around its hinges to a horizontal position to provide access to the cargo area for loading and unloading. Generally, the hinges are constructed so as to permit removal of the tailgate when it is in the horizontal position.

The need to lock the tailgate is twofold. First, particularly when a camper top or a tonneau cover is mounted on the truck, it is desirable to be able to lock the tailgate to protect the gear stowed inside. Second, the tailgate itself is a desirable object for theft.

Tailgates are generally constructed as a box section with an inner panel and an outer panel spaced apart by several inches. The handle and latching mechanism are mounted inside this space. To insert the latching mechanism, truck manufacturers have taken two different approaches. One approach is to insert the mechanism from the inside, by providing a removable access panel mounted on the inside panel. A second, less expensive approach is to insert the mechanism from the outside through the existing handle aperture of the outside panel. In this second approach, the handle aperture must be made large enough to accommodate insertion of the latching mechanism. To improve the appearance of the tailgate, a plastic snap-in bezel may be mounted into the void between the edges of the enlarged aperture and the handle.

A prior anti-theft device consists of a metal cover with a lock that latches into the handle aperture and covers the handle. A bezel around the handle, installed by the vehicle manufacturer is removed. The cover can then be locked in place, thereby preventing access to the handle. When the operator wishes to open the tailgate he/she unlocks the cover and removes it so as to gain access to the handle. These covers afford and attractive and secure anti-theft solution. However, they are somewhat inconvenient to use when frequent access to the tailgate is desired. Also, storage of the cover without misplacing it sometimes constitutes a problem and, furthermore, the tailgate presents an unattractive appearance when the cover is removed.

SUMMARY OF THE INVENTION

A tailgate locking device embodying the invention includes a bezel used in place of the conventional bezel that surrounds the tail-gate-handle aperture. When a key-operated lock is rotated to a locked position, it moves a locking arm into position in front of a handle arm, thereby preventing an interloper from actuating the handle to open the tailgate. In the preferred embodiment, the key-lock rotation also moves one or more retention bolts into position behind the exterior panel of the tailgate to prevent removal of the locking device. Rotation of key lock to its unlocked position, frees the tailgate handle and retracts the retention bolts.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
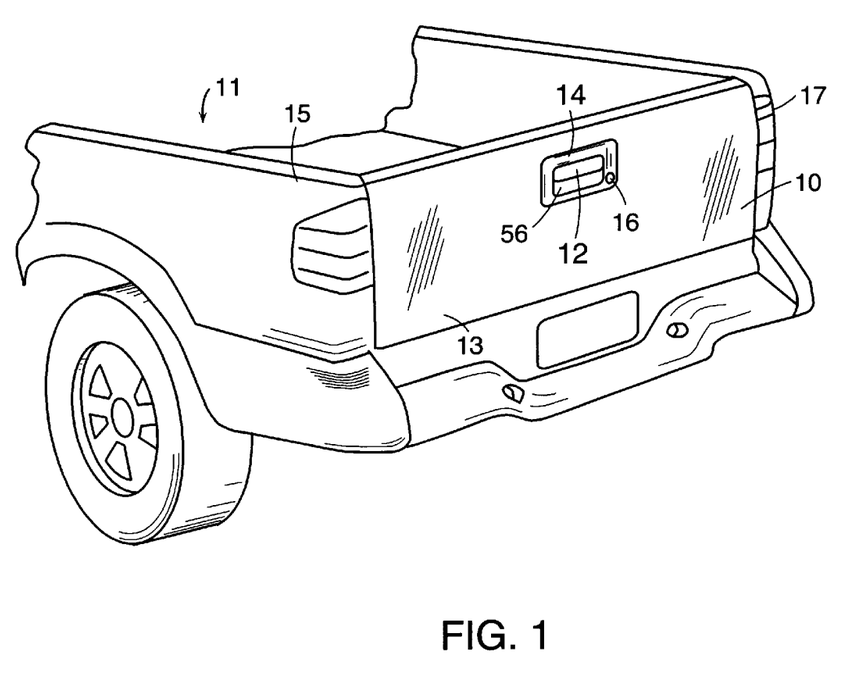
FIG. 1 is a perspective view of the tailgate on the back of a pickup truck showing the location of the invention.
Figure 10:
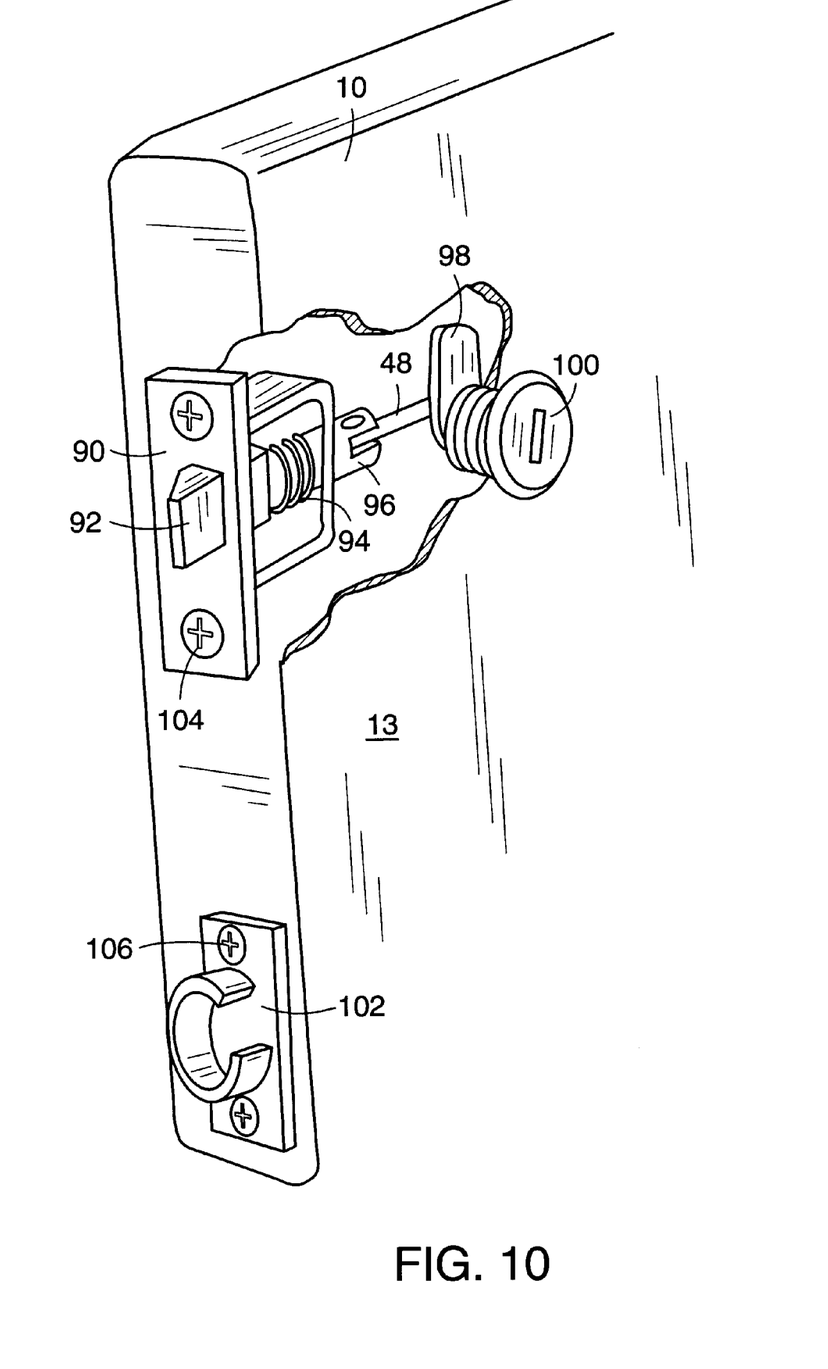
FIG. 10 is a perspective view of the edge of the tailgate partially cut away to show the latch and the anti-theft device according to a fifth embodiment of the invention.

As shown in FIG. 1, a tailgate 10, mounted on a pickup truck 11, has a release handle 12 disposed in a recess 56 in the exterior panel 13 of the tailgate. Conventionally the handle 12 is mechanically linked to spring-loaded bolts 92 (shown in FIG. 10) that engage the truck sidewalls 15 and 17 so as to retain the tailgate in the depicted upright or closed position. To lower the tailgate, the handle 12 is pulled outwardly, thereby retracting the bolts and permitting the tailgate to swing downwardly about a lower hinge 102 (FIG. 10). In accordance with the invention an anti-theft device includes a bezel 14 mounted on the panel 13 in place of the usual bezel provided with the truck. The bezel 14 carries components (not shown in FIG. 1) actuated by rotation of a key lock 16 to prevent operation of the handle 12 and thereby prevent opening of the tailgate 10.

Figure 2:
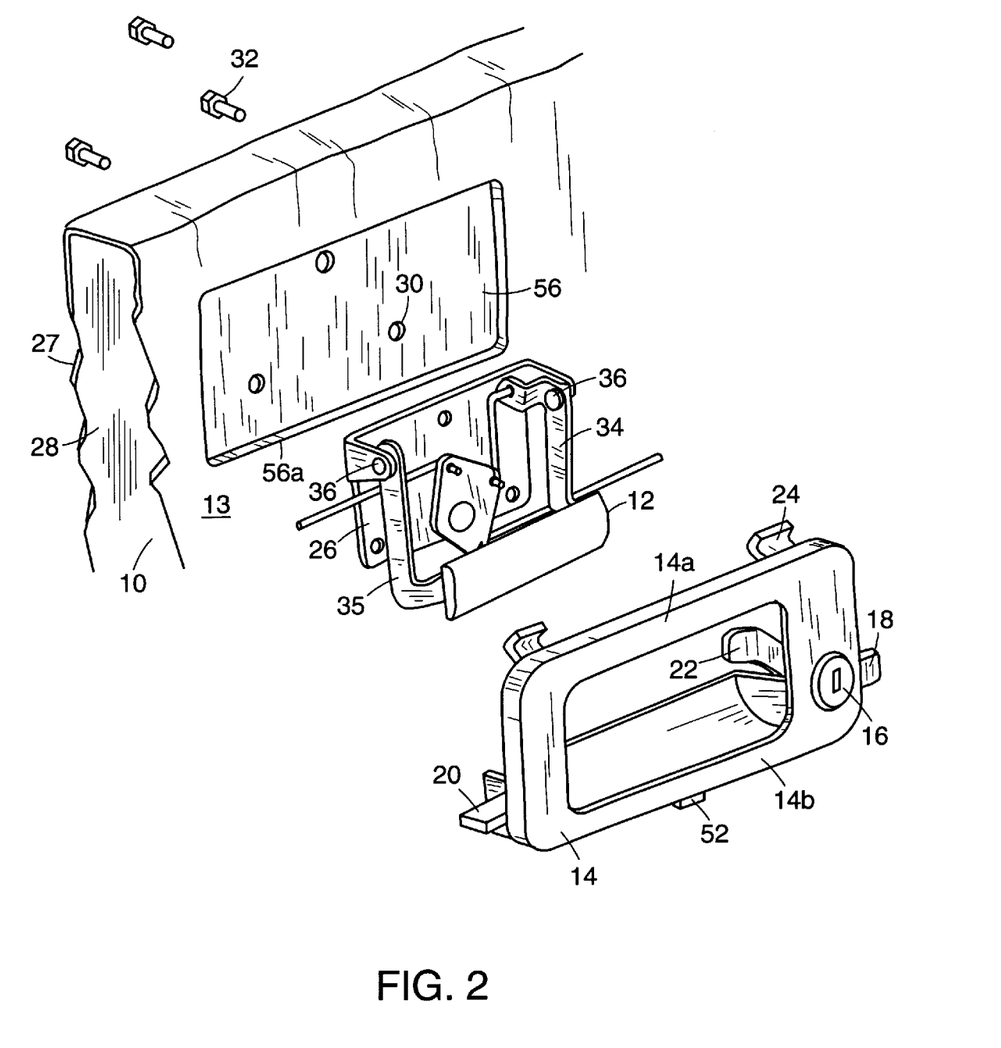
FIG. 2 is an exploded perspective view of the tailgate, the handle and latching mechanism, anti-theft device seen from the outside.
Figure 3:
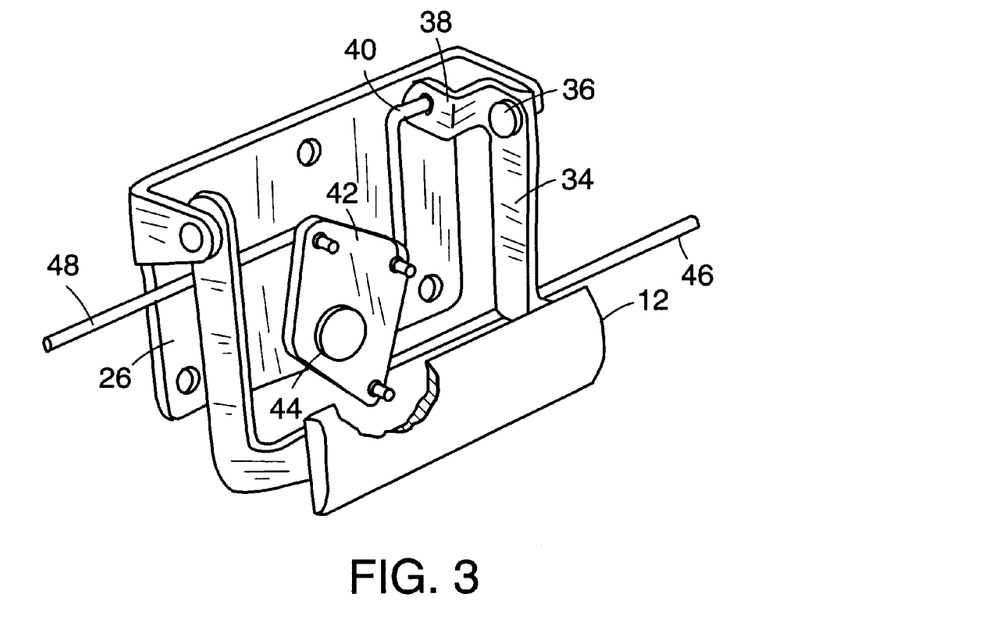
FIG. 3 is a perspective view of the handle and latching mechanism in the closed position.
Figure 4:
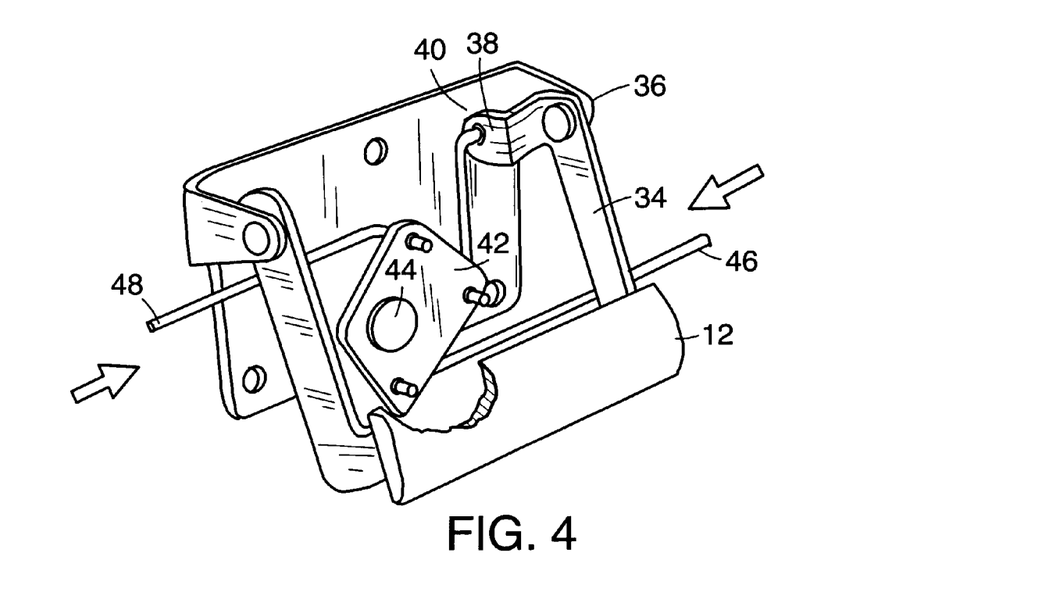
FIG. 4 shows the same in the open position.

As shown in FIGS. 2 to 4, the handle 12 has arms 34 and 35 that support the handle from pivots 36 on a baseplate 26. The baseplate is mounted against the rear panel 27 of the tailgate by means of bolts 32 that extend through the panel 27 into threaded holes in the plate 26. The arm 34 is linked to actuating rods 46 and 48 by means of a crank 38, connecting rod 40 and a plate 42 mounted on a pivot 44. The rods 46 and 48 are linked to the tailgate bolts 92 (FIG. 10) at the ends of the tailgate. In the illustrated mechanism, when the handle is pulled outwardly to the position shown in FIG. 4, rotation of the arm 34 causes retraction of the rods 46 and 48, thereby releasing the tailgate from the truck sidewalls 15 and 17 (FIG. 1). When the handle is released a spring arrangement (not shown) returns the handle to the position shown in FIG. 3, thereby extending the actuating rods so that the gate-locking bolts protrude from the ends of the tailgate.

With further reference to FIG. 2, a locking device incorporating the invention includes the bezel 14, which is mounted over the peripheral portions of the aperture 56 in place of the conventional bezel. A pair of angled tabs 24 extend rearwardly and upwardly from the upper leg 14a of the bezel and a retainer snap 52 is attached to the bottom leg 14b. The bezel can thus be mounted by inserting the tabs into the aperture 56, moving the bezel upwardly so that the tabs engage the interior surface of the exterior panel 13 and then rotating the bottom portion of the bezel inwardly so that a bottom cam surface on the snap 52 engages the panel 13 at the lower margin 56a of the aperture 56. The bottom portion of the snap rides up over the aperture margin 56a until the snap 52 clears the panel 13, at which point the snap springs downwardly to its original position, with a downward projection 52a (FIG. 5) positioned behind the panel 13 and thereby securing the bezel in place.

The snap 52 may be made of a breakable plastic so that the owner of the truck can remove the locking device by prying out the lower bezel leg 14b and thereby breaking the snap. Alternatively, a spring-loaded snap may be connected to a pull rod (not shown) or other mechanism accessible to the operator so that it can be forced upward to clear the aperture margins and thereby release the bezel 14.

Figure 5:
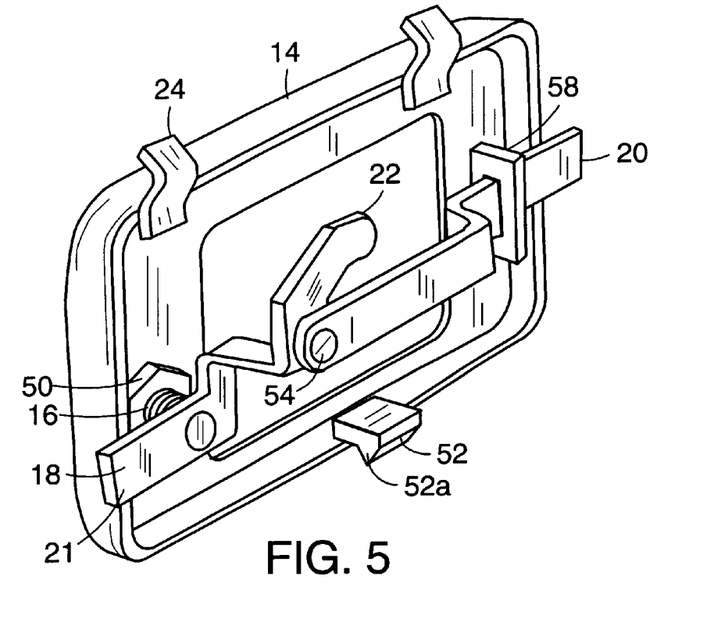
FIG. 5 is a perspective view of the anti-theft device in the locked position seen from the inside.

As shown in FIG. 5, the key-lock 16 is secured to the bezel by a nut 50. The locking device further includes a primary member 18 that is rotated by the lock 16. The member 18 includes a handle stop 22 extending inwardly from the lock 16 and a pivot 54 connected to a bolt 20 that extends through a guide 58. A second bolt 21, opposite the bolt 20, is an extension of the member 18.

With reference to FIGS. 2 and 5, the locking device serves a dual purpose. It locks the tailgate in place and furthermore locks the bezel against the rear panel 13 to prevent removal of the locking device. Specifically, when the movable parts are in the position illustrated in FIGS. 2 and 5, the bolts 20 and 21 extend behind the exterior panel 13 of the tailgate and thereby, in cooperation with the tabs 24, prevent removal of the locking device. Furthermore the stop 22 is positioned in front of the handle arm 34, thereby preventing outward movement of the handle. This prevents opening of the tailgate 10.

Figure 6:
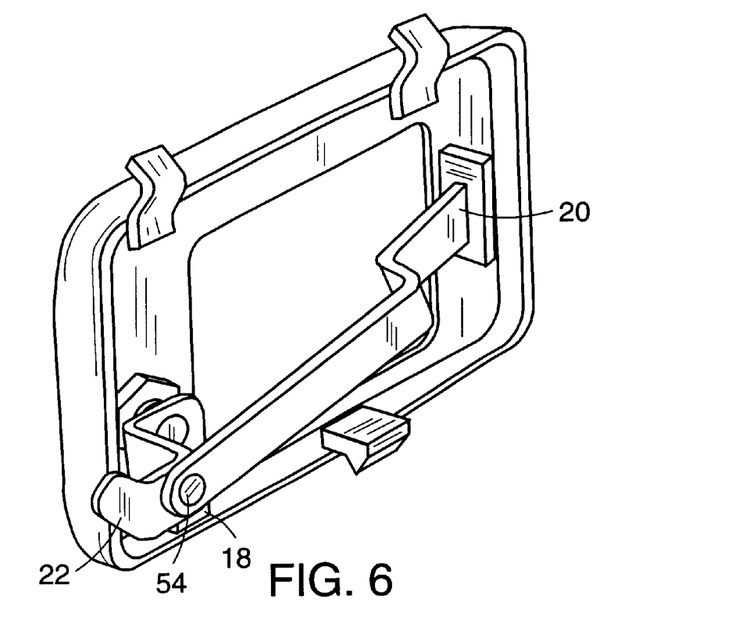
FIG. 6 shows the same in the unlocked position seen from the inside.

When the key 16 is rotated one-quarter turn clockwise (FIG. 2) the primary member 18 rotates counterclockwise correspondingly to the position shown in FIG. 6. The corresponding movement of the stop 22 clears the stop from the handle arm 34 and thereby permits operation of the handle 12 to open the tailgate. The same movement of the member 18 rotates the bolt 21 downwardly so that it no longer is positioned behind the panel 13. At the same time, rotation of the member 18 withdraws the bolt 20. The locking device can then be removed by fracture or disengagement of the snap 52.

Figure 7:
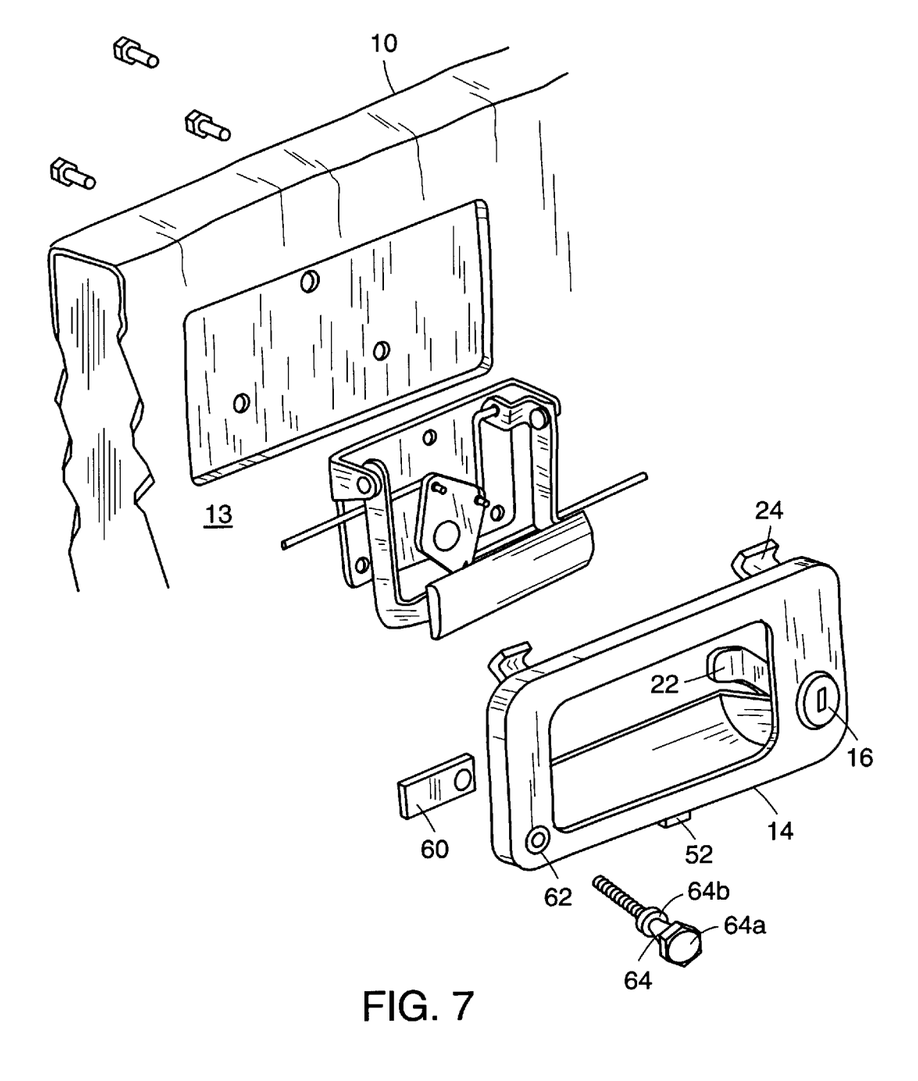
FIG. 7 is an exploded perspective view of the anti-theft made in accordance with a second embodiment of the invention.

In FIG. 7, I have illustrated another embodiment of the invention that provides a more permanent installation of the locking device. A locking bracket 60, extending behind the exterior panel 13, is threaded to receive a tamper-proof bolt 64 that extends through a bolt hole 62 in the bezel 14. When the bolt 62 is tightened, a break-away head 64a breaks away, leaving a head 64b that is inaccessible for rotation. With the locking device secured to the tailgate 10 in this fashion, there is no need for the bolts 20 and 21 of FIGS. 2 and 5, and they are therefore omitted from the embodiment of FIG. 7. To remove the anti-theft device of FIG. 7 for service, the head of the tamper-proof bolt 64 has to be drilled out and a new tamper-proof bolt used when the locking device is re-installed.

Figure 8:
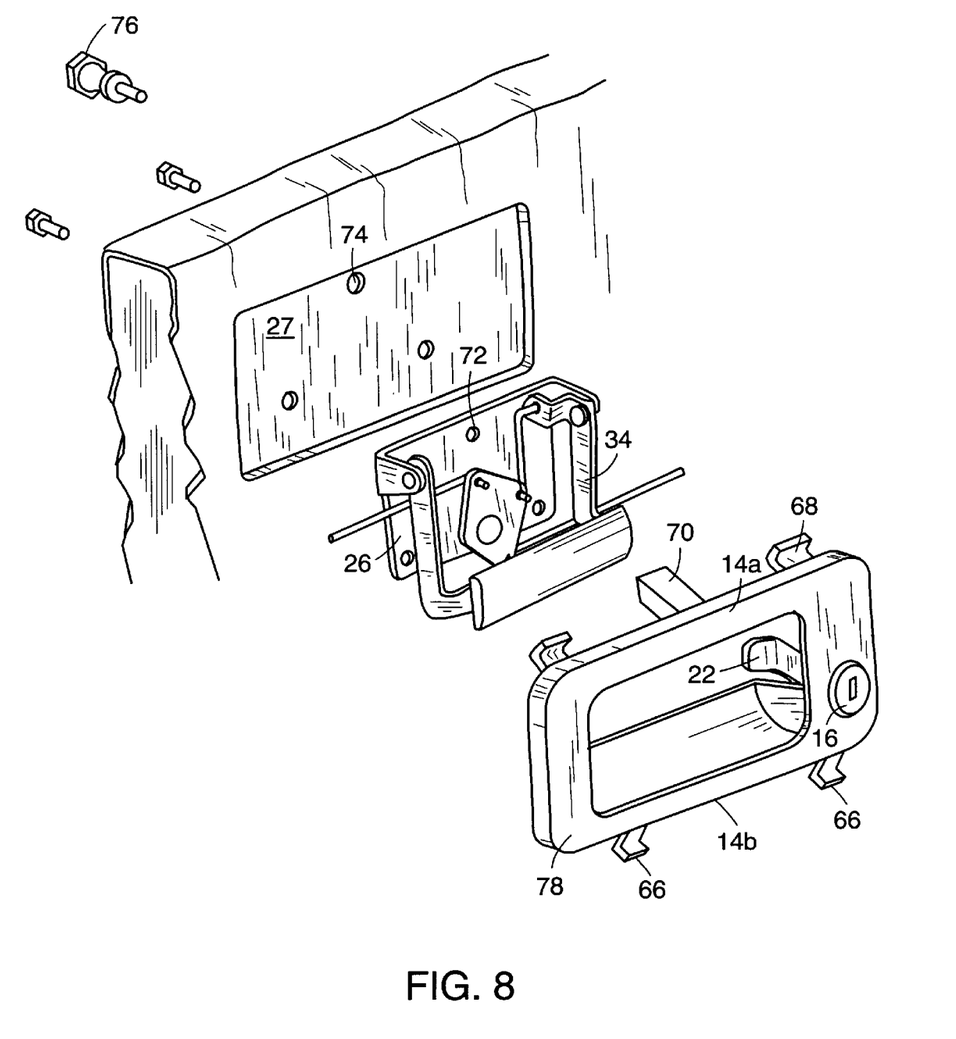
FIG. 8 is an exploded perspective view of the anti-theft device made in accordance with a third embodiment of the invention.

In FIG. 8, I have illustrated a variation of the embodiment of FIG. 7. A pair of locking tabs 66 extend from the bottom leg 14b of the bezel 14 and a pair of retainer snaps 68 are positioned at the top leg 14a. A boss 70 extends rearwardly from the top leg 14a to receive an inside tamper-proof bolt 76 that passes through holes 74 and 72 in the rear panel 27 and baseplate 26, respectively.

Figure 9:
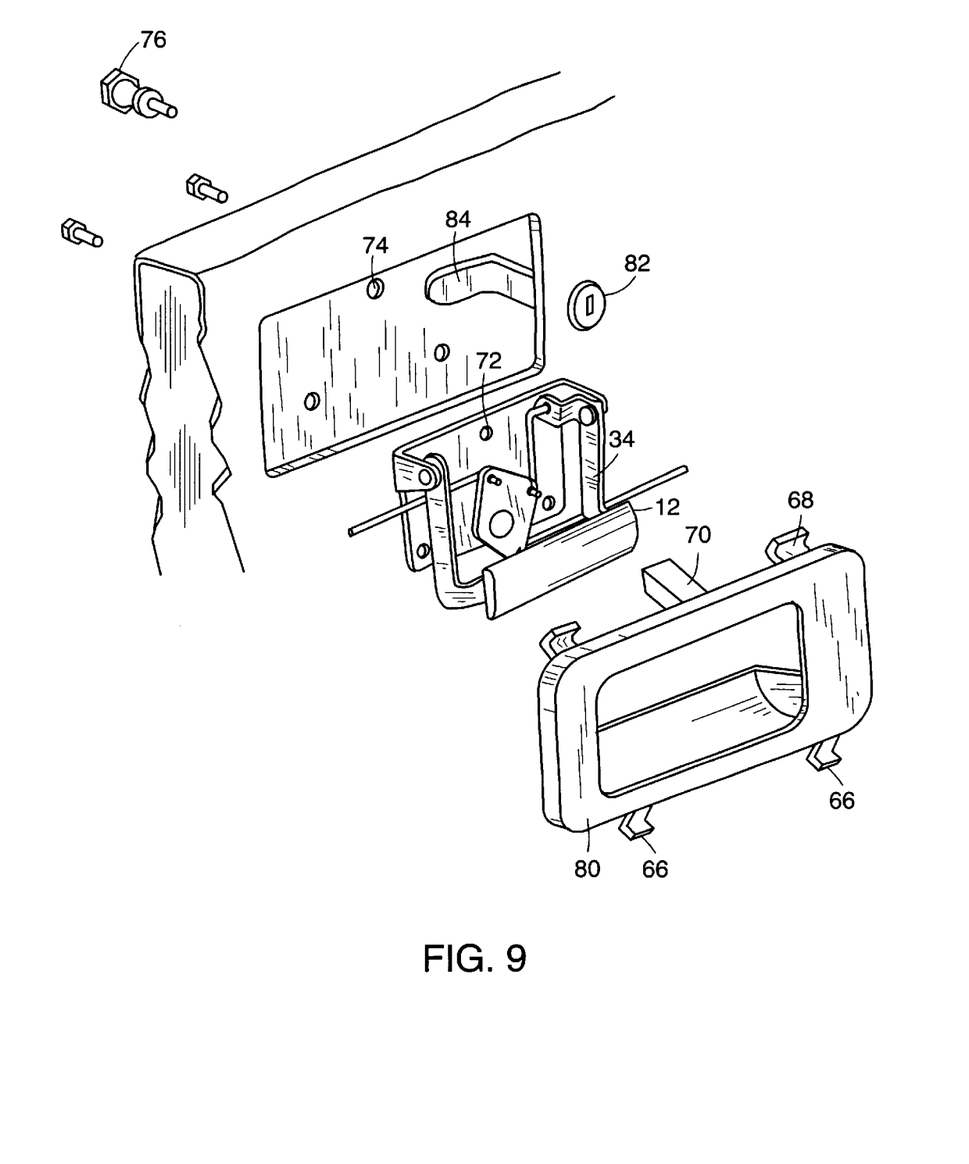
FIG. 9 is an exploded perspective view of the anti-theft device made in accordance with a fourth embodiment of the invention.

FIG. 9 illustrates a variation of the embodiment of the FIG. 8 in which the bezel 14 carries no moving parts. A key-operated lock 82 is mounted directly to the tailgate panel 13, with an angled locking stop 84 extending from the key lock. Rotation of the key lock rotates the stop 84 in the same manner as the stop 22 of FIGS. 2 and 5 so that in the locked position the stop 84 prevents actuation of the handle 12.

FIG. 10 illustrates another embodiment of the invention which operates more directly against retraction of the tailgate locking bolts. As shown therein, a mounting bracket 90, secured to an end of the tailgate 10, carries a latch bolt 92 that is coupled by a compression spring 94 to a latch boss 96. The boss 96, in turn, is connected to the actuating rod 48. A key lock 100 mounted in the panel 13 has an arm 98 shown in the unlocked position. When the lock 100 is rotated counterclockwise, the locking cam 98 prevents retraction of the rod 48 and boss 96. It thus also prevents retraction of rod 46 at the other end of the tailgate.

Access to the interior of the tailgate 10 for installation and servicing of the key lock 100 is provided by unscrewing mounting screws 104 and removing the mounting bracket 90. In this connection it will be noted that the screws 104 are inaccessible when the tailgate is closed and locked by means of the key lock 100.

FIG. 10 also illustrates a conventional hinge 102 secured by mounting screws 106 which both serves as a hinge and permits removal of the tailgate from the pickup truck.

What is claimed is:

1. A tailgate security device for a tailgate having a front panel and a rear panel, said front panel facing outwardly from a vehicle on which the tailgate is mounted, actuating rods positioned between the panels, axial displacement of the rods in a first direction securing the tailgate in a closed position, and in the opposite direction releasing the tailgate from the closed position, and further having an aperture with perimeter portions in the front panel and a recessed handle accessible through the aperture and linked to the actuating rods, whereby when the handle is pulled outward the handle displaces the rods in the first direction, the security device comprising;

A. a bezel plate for mounting on the front panel and, when mounted, covering the perimeter portions of the aperture;

B. a rotatable lock extending through the bezel plate and rotatable between locked and unlocked positions;

C. an arm attached to the lock and positioned between said panels when the bezel plate is mounted to the front panel, said arm being positioned so that in the locked position of the lock, said arm interferes with the rotation of the handle and thereby prevents release of the tailgate from the closed position thereof, and in the unlocked position of the lock, the arm permits rotation of the handle to release the tailgate; and D. a bolt mechanism actuated by the lock so that when the lock is in the locked position, the bolt mechanism extends behind the front panel and thereby prevents removal of the bezel plate and when the lock is in the unlocked position, the bolt mechanism is retracted and thereby permits removal of the bezel plate.

2. The security device of claim 1 including:

A. a retention tab extending from said bezel and whereby when said bezel is mounted to said front panel, the tab extends behind the front panel; and B. in which said bolt mechanism is positioned a distance from said tab so that when said lock is in said locked position, the tab cooperates with said bolt mechanism to lock said bezel to said front panel and when the lock is in the unlocked position, the bezel can be removed by rotating the bezel around the tab.

3. A tailgate security device for a tailgate having a front panel and a rear panel, said front panel facing outwardly from a vehicle on which the tailgate is mounted, actuating rods positioned between the panel, axial displacement of the rods in a first direction securing the tailgate in a closed position, and in the opposite direction releasing the tailgate from the closed position, and further having an aperture with perimeter portions in the front panel and a recessed handle accessible through the aperture and linked to the actuator rods, whereby when the panel is pulled outward, the handle displaces the rods in the first direction, the security device comprising a bezel plate for mounting on the front panel, said bezel plate covering the perimeter portions of the aperture;

locked and unlocked positions;

an arm attached to the lock and positioned between said panels when the bezel plate is secured to the front panel, said arm being positioned so that in a locked position of the lock, said arm interferes with the rotation of the handle and thereby prevents release of the tailgate from the closed position thereof, and in the unlocked position of the lock, said arm permits rotation of the handle to release the tailgate, and secure connection means connecting the bezel plate to the rear panel of the tailgate, said secure connection means remaining secure even with access to said rear panel.

4. The security device of claim 3 wherein said connecting means include means extending rearwardly from said bezel, and a tamper-proof fastener connecting said extending means to the rear panel of the tailgate.

5. A tailgate security device for a tailgate of the type having a front panel and a rear panel, said front panel facing outwardly from a vehicle on which the tailgate is mounted, actuating rods positioned between the panels, axial displacement of the rods in a first direction securing the tailgate in a closed position, and in the opposite direction releasing the tailgate from the closed position, and further having an aperture with perimeter portions in the front panel and a recessed handle accessible through the aperture and linked to the actuator rods, whereby when the handle is pulled outward, the handle displaces the rods in the first direction, a snap-in bezel for mounting on the front panel, said bezel having resilient tabs which engage behind the front panel so as to releasably secure the bezel to the front panel thereby covering the perimeter portions of the aperture, said security device comprising:

a replacement bezel plate for said snap-in bezel;

a rotatable lock extending through the bezel plate and rotatable between locked and unlocked positions;

an arm attached to the lock, and a connector for securing the bezel plate to the tailgate in place of the snap-in bezel such that, in the locked position of the lock, said arm interferes with the rotation of the handle and thereby prevents release of the tailgate from said closed position thereof and in the unlocked position of the lock, said arm permits rotation of the handle to release the tailgate from the closed position.

6. The security device of claim 5 wherein said bezel plate also has resilient tabs which engage behind the front panel so as to releasably secure the bezel plate to the front panel when the lock is in the unlocked position.

7. The security device of claim 5 wherein said connector comprises a bolt mechanism actuated by the lock so that when the lock is in said locked position, the bolt mechanism is extended behind the front panel and thereby prevents removal of the bezel plate and when the lock is in said unlocked position, the bolt mechanism is retracted frown behind the front panel and thereby permits removal of the bezel plate.

8. The security device of claim 5 wherein said connector extends rearwardly from said bezel plate to said rear panel fastening said bezel plate to the rear panel.

9. A security device of claim 8 wherein the connector is a tamper proof bolt.

\* \* \* \* \*

UNITED STATES PATENT AND TRADEMARK OFFICE
CERTIFICATE OF CORRECTION

PATENT NO. : 6,209,366 B1
DATED : April 3, 2001
INVENTOR(S) : Dimiter S. Zagoroff It is certified that error appears in the above-identified patent and that said Letters Patent is hereby corrected as shown below:

Column 5, claim 3,
Line 26, before "locked and unlocked positions;" insert the following:
-- a rotatable lock extending through the bezel plate and rotatable between --.

Column 6, claim 6,
Line 37, change "frown" to -- from --.

Signed and Sealed this

Twenty-fifth Day of December, 2001

Attest:

JAMES E. ROGAN
*Attesting Officer*  *Director of the United States Patent and Trademark Office*